United States Patent
Van der Steen

(10) Patent No.: US 9,548,567 B2
(45) Date of Patent: Jan. 17, 2017

(54) ELECTRICAL CARD CONNECTOR CAPABLE OF INDICATING CARD'S FALSE INSERTION

(71) Applicant: FOXCONN INTERCONNECT TECHNOLOGY LIMITED, Grand Cayman (KY)

(72) Inventor: Hendrikus P. G. Van der Steen, Den Dungen (NL)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/656,630

(22) Filed: Mar. 12, 2015

(65) Prior Publication Data
US 2015/0263455 A1    Sep. 17, 2015

(30) Foreign Application Priority Data
Mar. 12, 2014 (CN) .......................... 2014 1 0088587

(51) Int. Cl.
*H01R 13/62* (2006.01)
*H01R 13/641* (2006.01)
*H01R 13/635* (2006.01)
*G06K 13/08* (2006.01)

(52) U.S. Cl.
CPC ......... *H01R 13/641* (2013.01); *G06K 13/0837* (2013.01); *H01R 13/635* (2013.01)

(58) Field of Classification Search
CPC . H01R 13/641; H01R 12/721; H01R 23/6873; H01R 13/6461; H01R 23/005; G06K 13/0831
USPC ................... 439/159, 345, 630, 607.31, 941
See application file for complete search history.

(56) References Cited

U.S. PATENT DOCUMENTS

| | | | | |
|---|---|---|---|---|
| 6,739,911 B2 * | 5/2004 | Wagatsuma | ......... | H01R 13/629 439/607.31 |
| 6,814,596 B2 * | 11/2004 | Yu | ...................... | G06K 13/0856 439/159 |
| 6,843,670 B2 * | 1/2005 | Yamaguchi | ............ | G06K 13/08 439/157 |

(Continued)

FOREIGN PATENT DOCUMENTS

| CN | 103022817 | 4/2013 |
|---|---|---|
| CN | 103633506 A | 3/2014 |

*Primary Examiner* — Tulsidas C Patel
*Assistant Examiner* — Peter G Leigh
(74) *Attorney, Agent, or Firm* — Wei Te Chung; Ming Chieh Chang

(57) ABSTRACT

An electrical card connector (100) includes an insulative housing (1), a number of contacts (2) retained in the insulative housing, a metal shell (3) covering the insulative housing for defining a receiving space, a slider (4) moveably assembled on the insulative housing, a spring member (5) biasing the slider, and a pin member (6). The slider includes a base portion (41) and an actuating portion (42) sidewardly protruding from the base portion into the receiving space. The slider has a guiding slot (410), an inner heart-shaped slot (411) connecting with the guiding slot, and an outer cam slot (412) connecting with the inner heart-shaped slot. The pin member has a first end (61) secured to the insulative housing and a second end (62). The second end is normally guided in the inner heart-shaped slot but guided to the outer cam slot when a card is improperly inserted.

18 Claims, 15 Drawing Sheets

(56) References Cited

U.S. PATENT DOCUMENTS

| | | | | |
|---|---|---|---|---|
| 7,118,395 B2 * | 10/2006 | Tsuji | G06K 13/0856 | 439/159 |
| 7,278,866 B1 * | 10/2007 | Van der Steen | H01R 13/629 | 439/159 |
| 7,381,094 B2 * | 6/2008 | Miyao | G06K 13/08 | 439/630 |
| 7,410,375 B2 * | 8/2008 | Van der Steen | G06K 13/0806 | 439/159 |
| 8,246,366 B2 * | 8/2012 | Tsai | G06K 13/08 | 439/159 |
| 8,262,397 B1 * | 9/2012 | Van Der Steen | G06K 13/0818 | 439/159 |
| 8,500,469 B2 * | 8/2013 | Takai | G06K 7/0043 | 439/159 |
| 8,608,494 B2 * | 12/2013 | Yang | H01R 12/7094 | 439/159 |
| 8,632,350 B2 * | 1/2014 | Uesaka | G06K 13/0825 | 439/159 |
| 8,851,911 B2 * | 10/2014 | Tsuji | G06K 13/0831 | 439/159 |
| 2012/0315781 A1 | 12/2012 | Little et al. | | |

* cited by examiner

ELECTRICAL CARD CONNECTOR CAPABLE OF INDICATING CARD'S FALSE INSERTION

BACKGROUND OF THE INVENTION

1. Field of the Invention

The present invention relates generally to an electrical card connector, and more particularly to an electrical card connector capable of indicating card's false insertion.

2. Description of Related Arts

China Patent Application Publication No. 103022817 published on Apr. 3, 2013 discloses an electrical card connector capable of preventing a card from being falsely inserted and easily identifying the false insertion of the card. The card connector has a slider, a pin member, a cam mechanism, and a stopper. The cam mechanism defines a first cam groove and a second cam groove. After the first push-in force along an insertion direction to the card is released, the slider pushed by the card through the first cam groove is guided to a locking position on which the slider is prevented from moving along the ejection direction. When the card is pushed along the insertion direction again, the slider moves away from the locking position towards the original position along the ejection direction under the second push-in force. The second cam groove is branched from the midway of the first cam groove. The stopper is movably attached on the slider and beside the cam mechanism. When the card is inserted at the normal posture, the stopper obstructs the second cam groove of the slider and the pin member is guided to the locking position. When the card is inserted at the not-normal posture, i.e., improperly inserted, the stopper is pushed by the card and moves along the insertion direction to expose the second cam groove and, therefore, the pin member is guided to the second cam groove and then return to an original position instead of the locking position. This electrical card connector effectuates identification of the false insertion of the card by way of an attached metal stopper.

An electrical card connector capable of indicating card's false insertion is desired.

SUMMARY OF THE INVENTION

Accordingly, an object of the present invention is to provide an electrical card connector capable of indicating card's false insertion.

To achieve the above object, an electrical card connector includes an insulative housing, a number of contacts retained in the insulative housing, a metal shell covering the insulative housing for defining a receiving space, a slider moveably assembled on the insulative housing, a spring member biasing the slider, and a pin member. The slider includes a base portion and an actuating portion sidewardly protruding from the base portion into the receiving space. The slider has a guiding slot, an inner heart-shaped slot connecting with the guiding slot, and an outer cam slot connecting with the inner heart-shaped slot. The pin member has a first end secured to the insulative housing and a second end. The second end is normally guided in the inner heart-shaped slot but guided to the outer cam slot when a card is improperly inserted.

Other objects, advantages and novel features of the invention will become more apparent from the following detailed description when taken in conjunction with the accompanying drawings.

DETAILED DESCRIPTION OF THE PREFERRED EMBODIMENT

Figure 1:
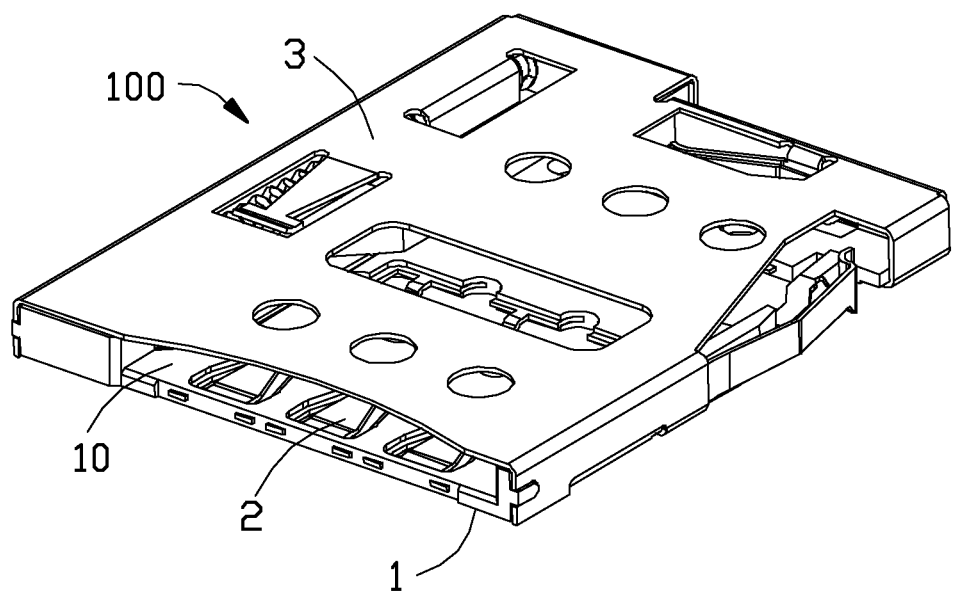
FIG. 1 is a perspective, assembled view of an electrical card connector constructed in accordance with the present invention.

Reference will now be made in detail to the preferred embodiment of the present invention.

Referring to FIGS. 1-15, an electrical card connector 100 of the present invention, used for receiving an electrical card 200. The frame-shaped electrical card 200 comprises a cut-up corner 201 and three right-angled corners 202, 203, 204. The electrical card 200 is inserted into the electrical card connector 100 along an insertion direction. The electrical card connector 100 comprises an insulative housing 1, a plurality of contacts 2 retained in the insulative housing 1, a metal shell 3 covering the insulative housing 1 for defining a receiving space 10, a slider 4 movably assembled at a side of the insulative housing 1, a spring element 5 compressed between the slider 4 and the insulative housing 1 for biasing the slider 4 towards an ejection direction opposite to the insertion direction, and a pin member 6 with a first end 61 thereof secured to the insulative housing 1 and a second end 62 thereof guided in the slider 4.

Figure 2:
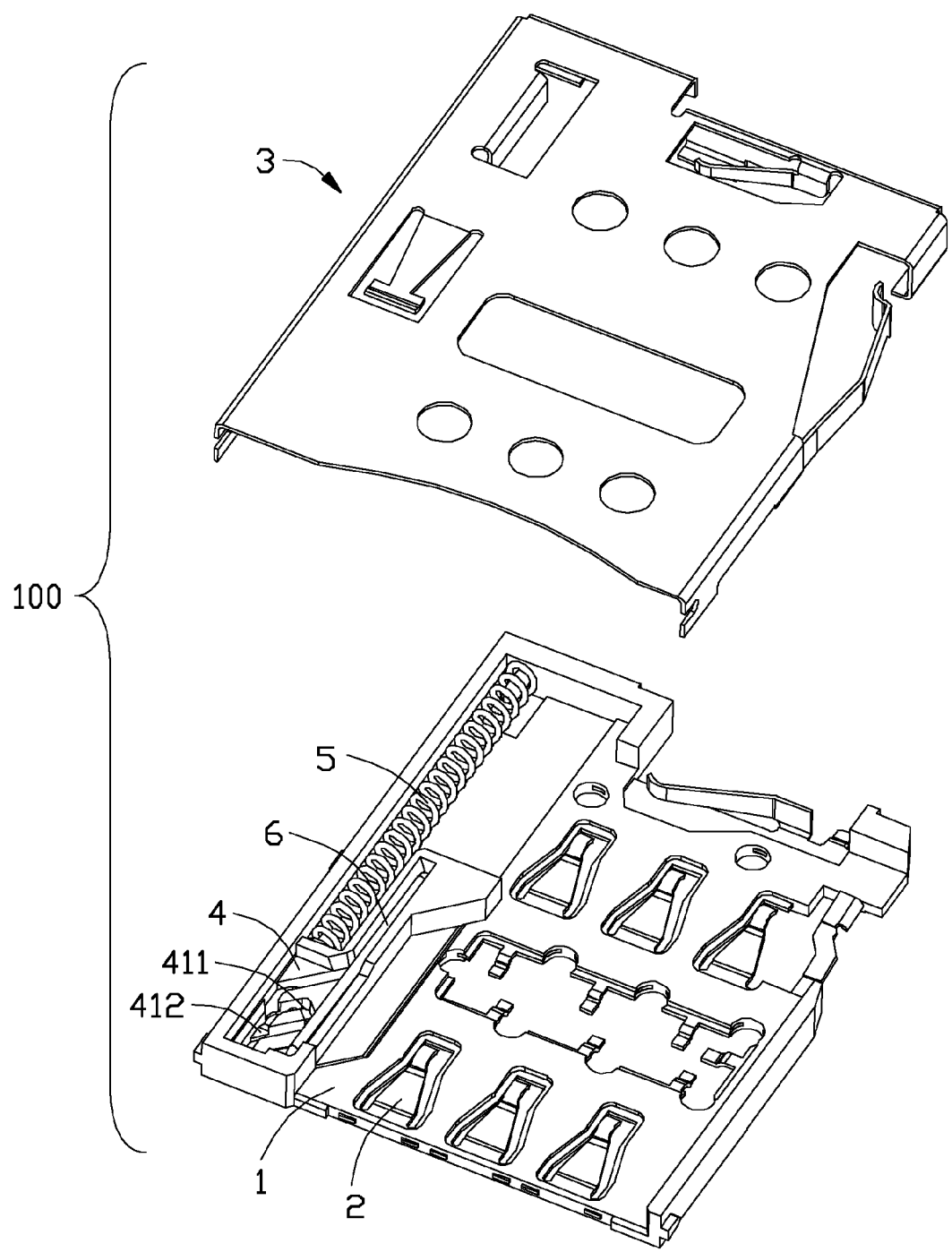
FIG. 2 is a perspective, partly exploded view of the electrical card connector of FIG. 1.
Figure 3:
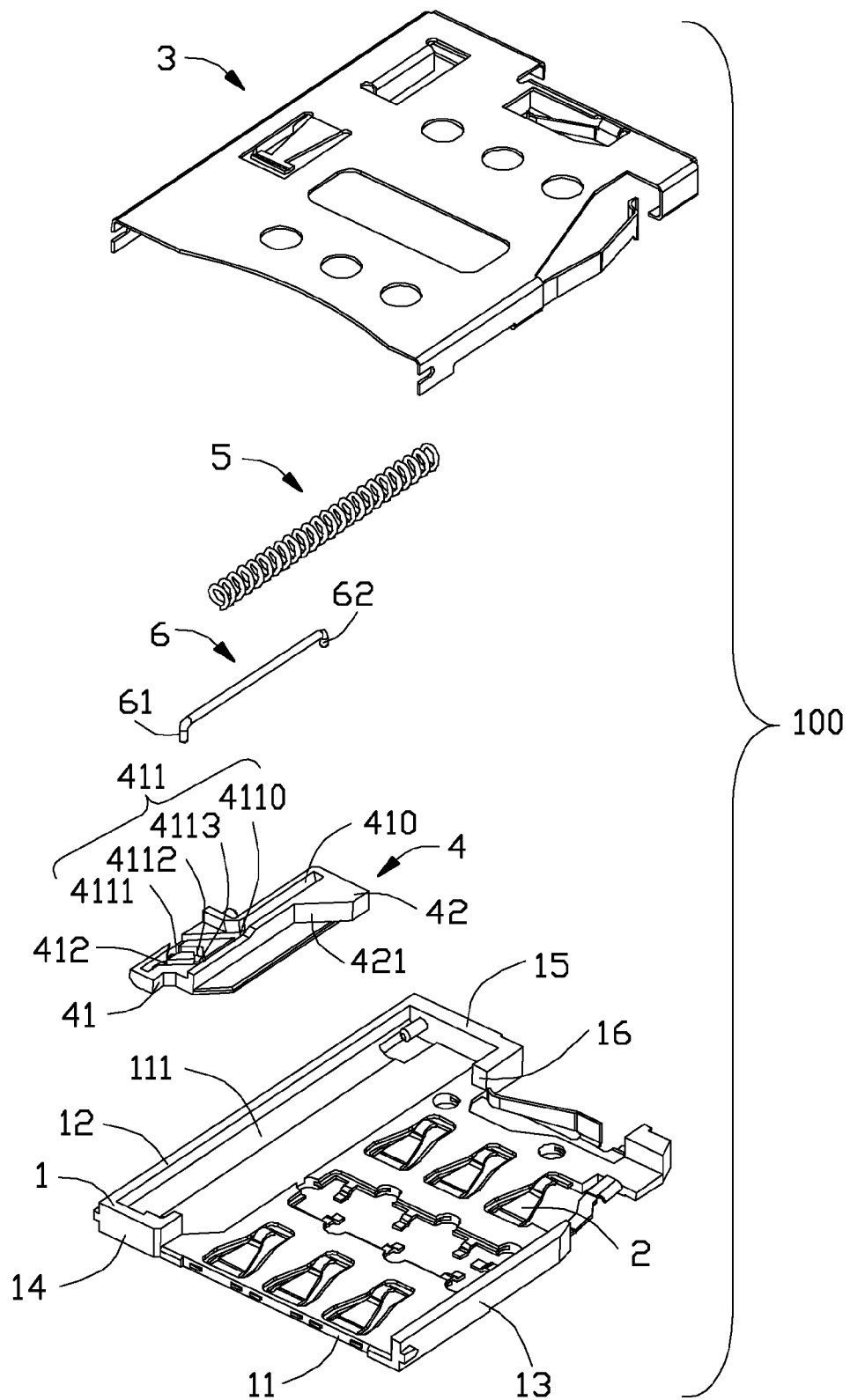
FIG. 3 is a perspective, fully exploded view of the electrical card connector of FIG. 1.

Referring to FIGS. 2 and 3, the insulative housing 1 comprises a main portion 11, a left wall 12 and a right wall 13 extending vertically from two lateral edges of the main portion 11, a front wall 14 and a first rear wall 15 oppositely facing and both connecting with the left wall 12, and a second rear wall 16 connecting to the first rear wall 15. The second rear wall 16 is positioned between the front wall 14 and the first rear wall 15 along the insertion/ejection direction and between the left wall 12 and the right wall 13 along a transverse direction perpendicular to the insertion/ejection direction. The second rear wall 16 is adjacent to the first rear wall 15 along the insertion/ejection direction and the left wall 12 along the transverse direction. The main portion 11 defines a recess 111 abutting against the left wall 12 for receiving the spring element 5. The recess 111 extends along the insertion/ejection direction.

Figure 4:
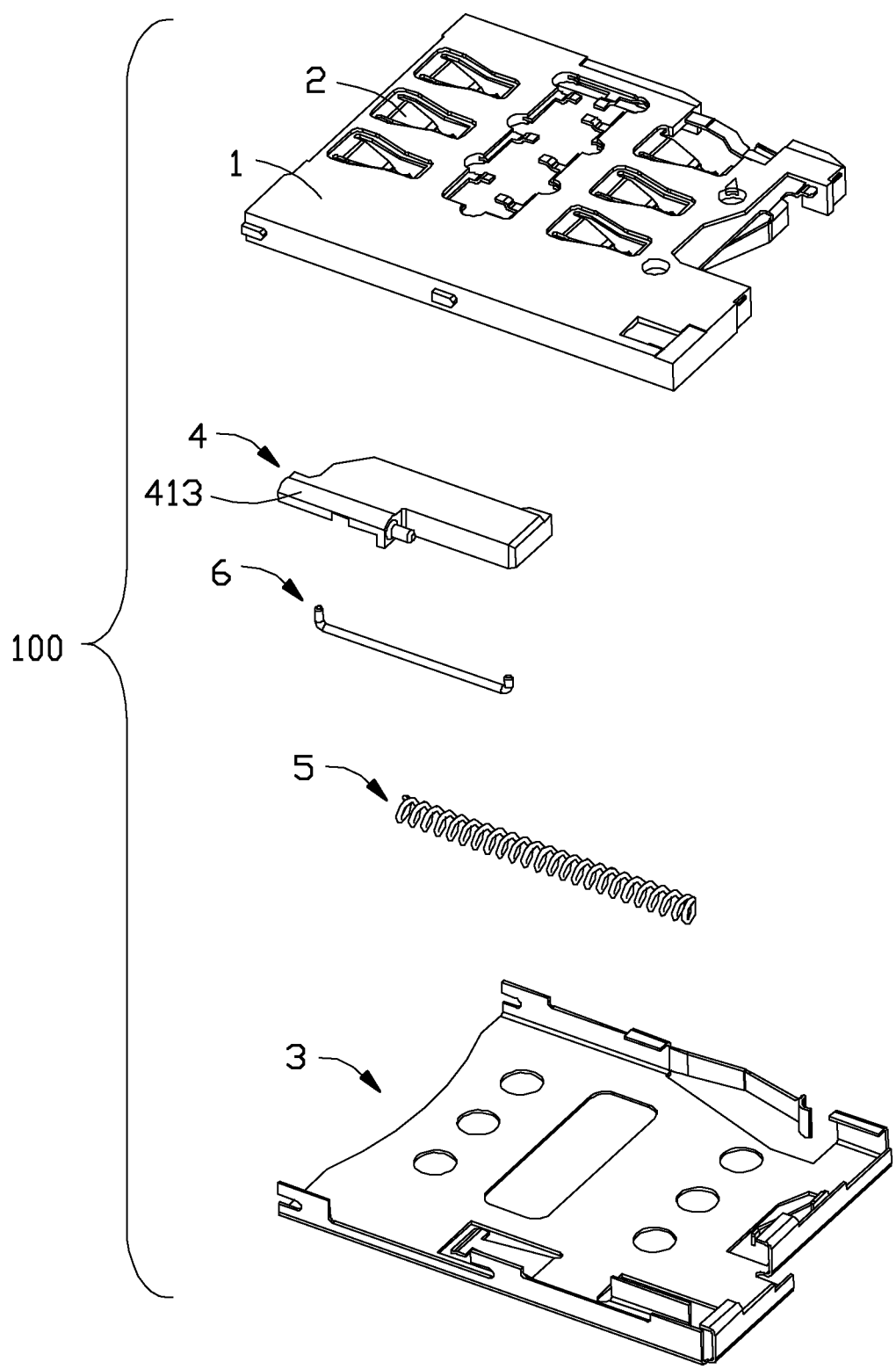
FIG. 4 is similar to FIG. 3, but taken from a different view.

Referring to FIGS. 2, 3, and 4, the slider 4 comprises a base portion 41 and an actuating portion 42 sidewardly protruding from the base portion 41. The actuating portion 42 has a slant surface 421 facing towards the receiving space 10 for engaging with the electrical card 200. The base portion 41 has an upper surface facing towards the metal shell 3 and a lower surface facing towards the insulative housing 1. The base portion 41 defines a guiding slot 410, an inner heart-shaped slot 411 connecting with the guiding slot 410, and an outer cam slot 412 connecting with the inner heart-shaped slot 411, at the upper face thereof. The inner heart-shaped slot 411 has a locking portion 4112, an initial position 4110 at a front side of the locking portion 4112, a first excessive-insertion position 4111 at a left and back side of the locking portion 4112, and a second excessive-insertion position 4113 at a right and back side of the locking portion 4112. Therefore, a circle of the initial position 4110→the first excessive-insertion position 4111→the locking portion 4112→the second excessive-insertion position 4113→the initial position 4110 forms a normal trace of the pin member 6 when the electrical card 200 is inserted into the electrical card connector 100 at a normal posture, which is well-known to persons skilled in the art, as partly shown in FIGS. 5 and 6. The locking portion 4112 is forwardly recessed towards the initial position 4110 with respect to the first excessive-insertion position 4111 and the second excessive-insertion position 4113. The inner heart-shaped slot 411 has a biggest depth at the locking portion 4112 and therefore, the pin member 6 is securely positioned at the locking portion 4112 when the electrical card 200 is fully and steadily inserted in the electrical card connector 100.

Referring to FIGS. 2, 3, and 4, the outer cam slot 412 has a left cam slot 4121 connected to the first excessive-insertion position 4111 and a right cam slot 4122 connected to the second excessive-insertion position 4113. The outer cam slot 412 has an acute corner portion 4120 connecting between the left cam slot 4121 and the right cam slot 4122. The acute corner portion 4120 protrudes backwardly opposite to the locking portion 4112. The left cam slot 4121 has a depth smaller than the right cam slot 4122 and therefore, when the pin member 6 is guided in the left cam slot 4121, the pin member 6 directly moves into the right cam slot 4122 without being secured at the acute corner portion 4120.

Figure 5:
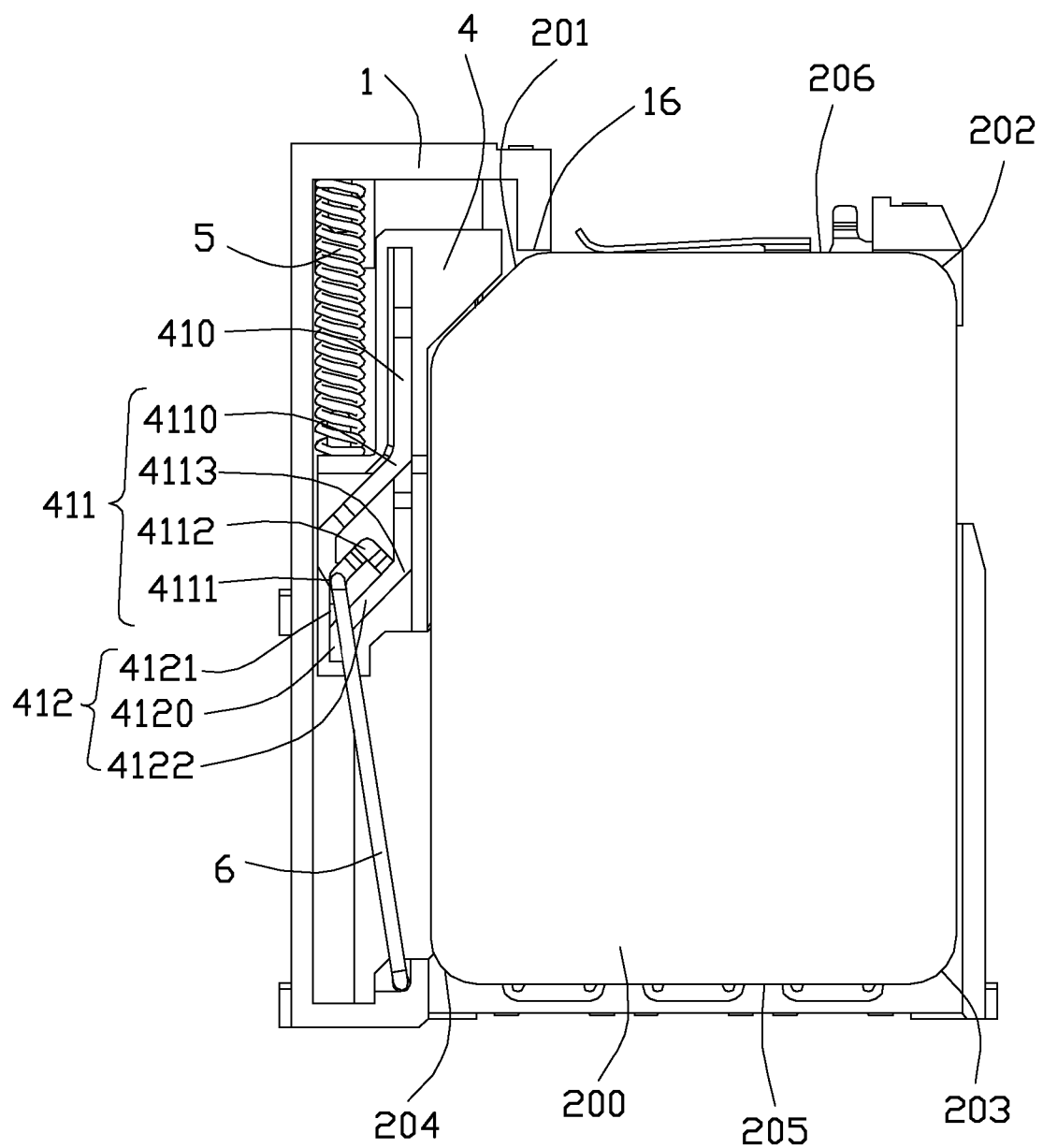
FIGS. 5 and 6 are elevational views of an electrical card normally inserted into the electrical card connector of FIG. 1.
Figure 6:
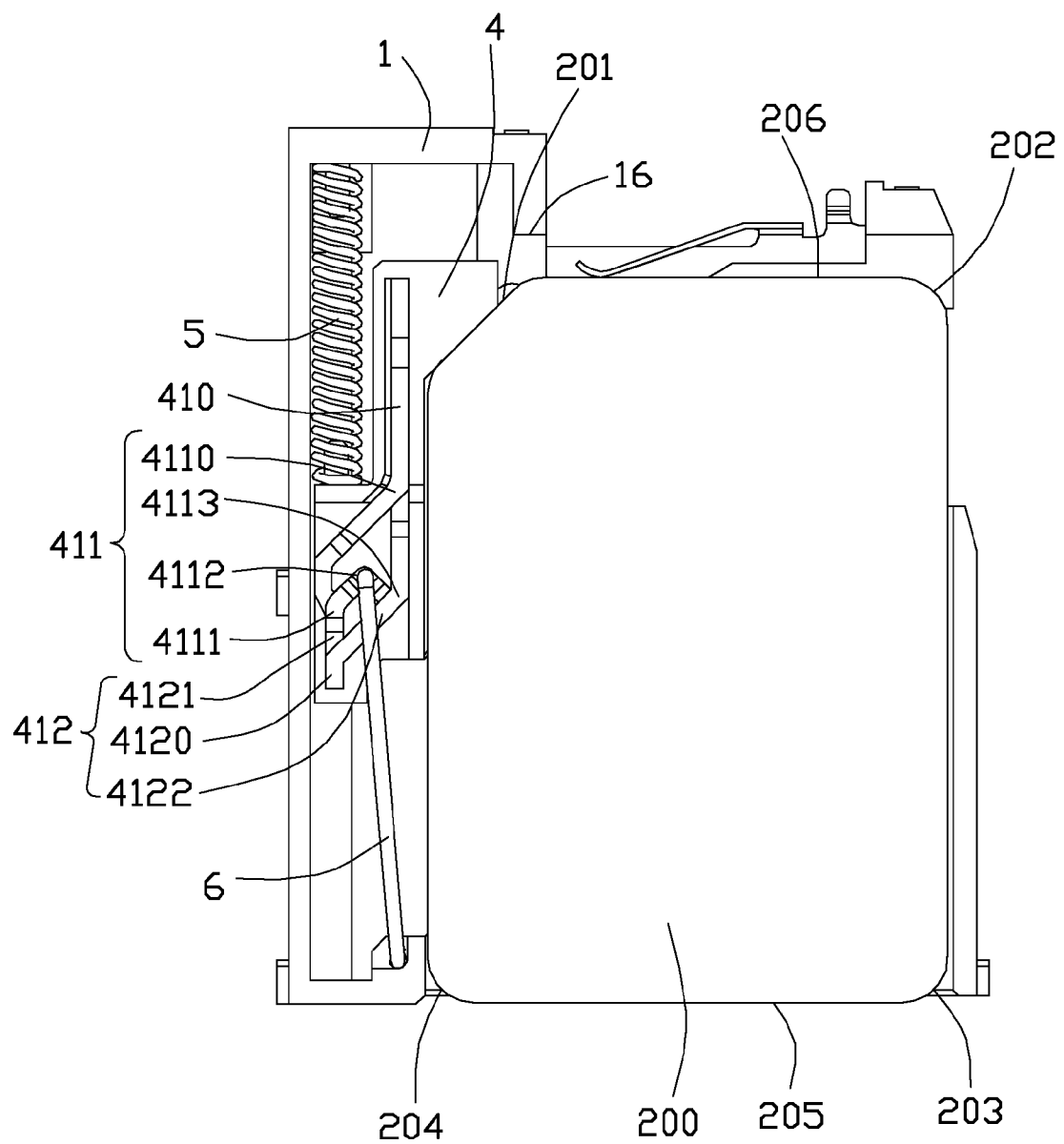

FIGS. 5 and 6 partly show that the electrical card 200 is inserted into the electrical card connector 100 at a normal posture when the cut-up corner 201 is positioned at a left and upper side of the electrical card 200. A user pushed on the electrical card 200 and the cut-up corner 201 of the electrical card 200 engages with the slant surface 421 of the actuating portion 42 to move the slider 4 along the insertion direction. Because a mating margin 206 between the cut-up corner 201 and the first right-angled corner 202 interferes with the second rear wall 16 (which is deemed as a stopper) of the insulative housing 1 when the pin member 6 is positioned at the first excessive-insertion position 4111, the electrical card 200 is not inserted along the insertion direction. Because the user no longer pushes on the electrical card 200, the pin member 6 has no chance to move into the outer came slot 412 but moves to the locking position 4112 and finally is secured in the locking position 4112. Ejection of the electrical card 200 in accordance with the pin member 6 moves from the locking position 4112 is well-known to persons skilled in the art, and it is not described in detail here.

FIGS. 7-15 showing three false postures of the electrical card 200 when the cut-up corner 201 is respectively positioned at a right and upper side, a left and lower side, and a right and lower side of the electrical card 200. Because the three right-angled corners 202, 203, 204 are respectively engaged with the slant surface 421 of the slider 4 at the three false postures, the principles of the electrical card 200 inserted at three false postures are same to each other for unified description below.

Figure 7:
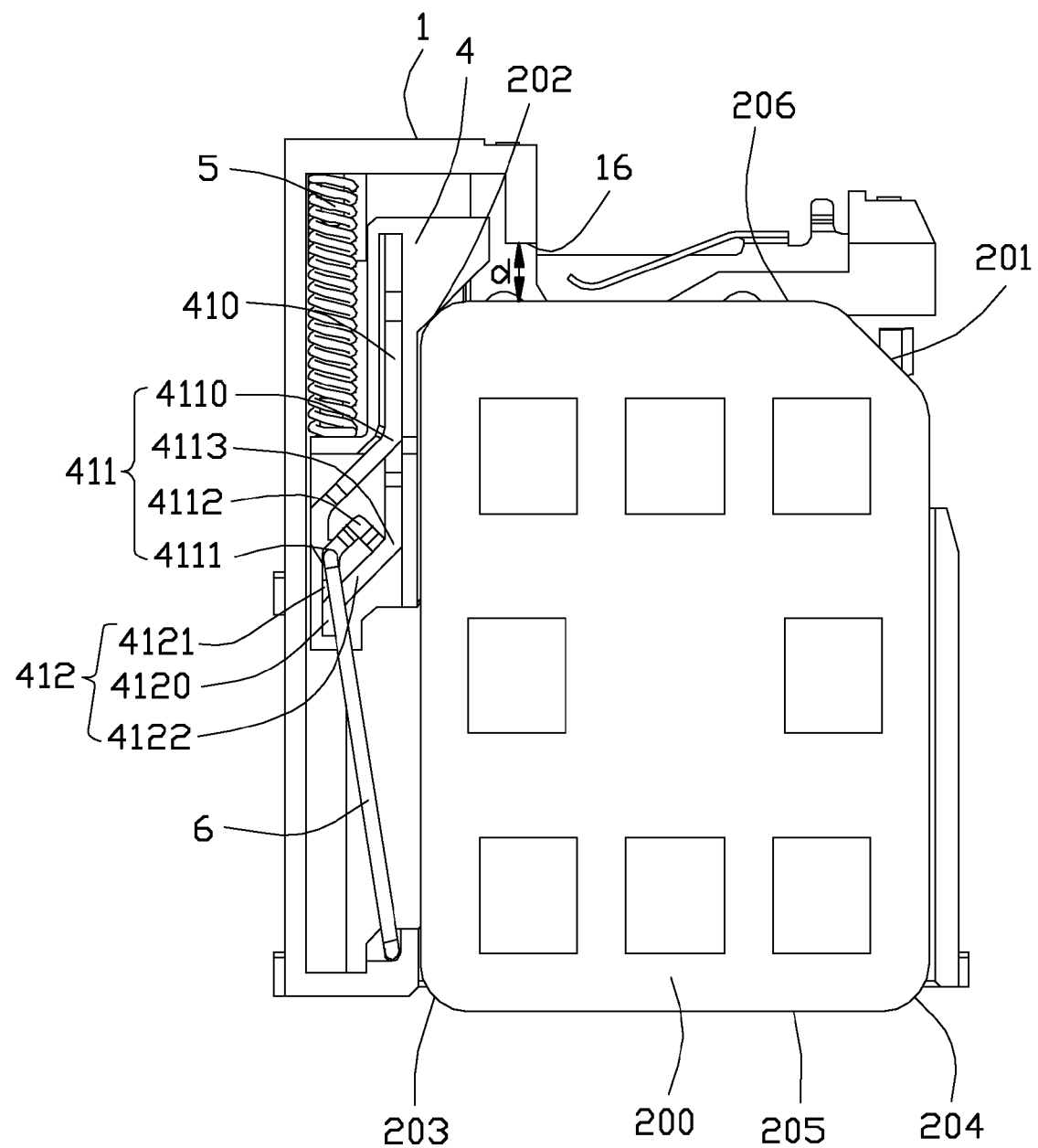
FIGS. 7, 8, and 9 are elevational views of the electrical card inserted into the electrical card connector of FIG. 1 at a first false posture.
Figure 10:
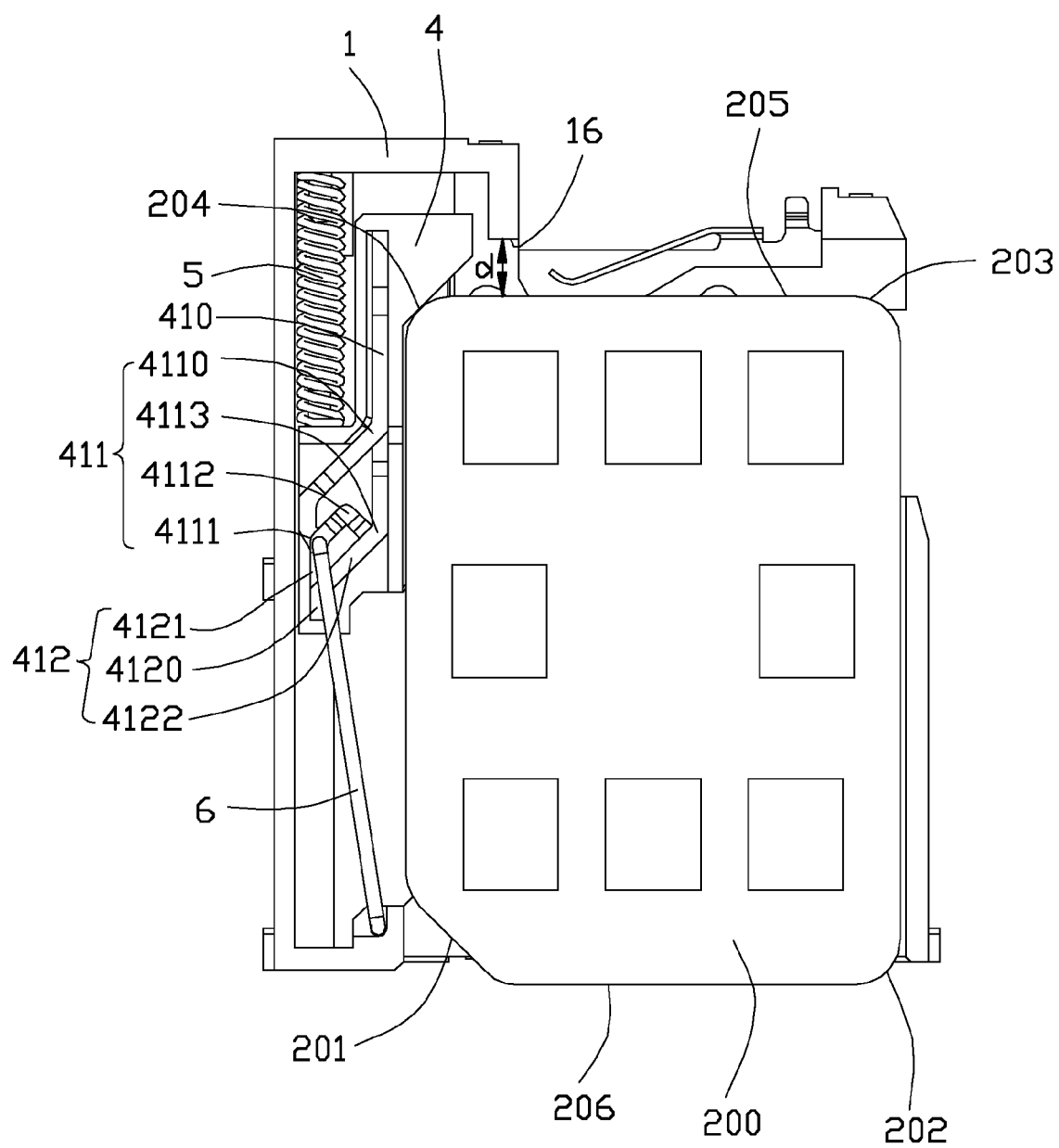
FIGS. 10, 11, and 12 are elevational views of the electrical card inserted into the electrical card connector of FIG. 1 at a second false posture.
Figure 13:
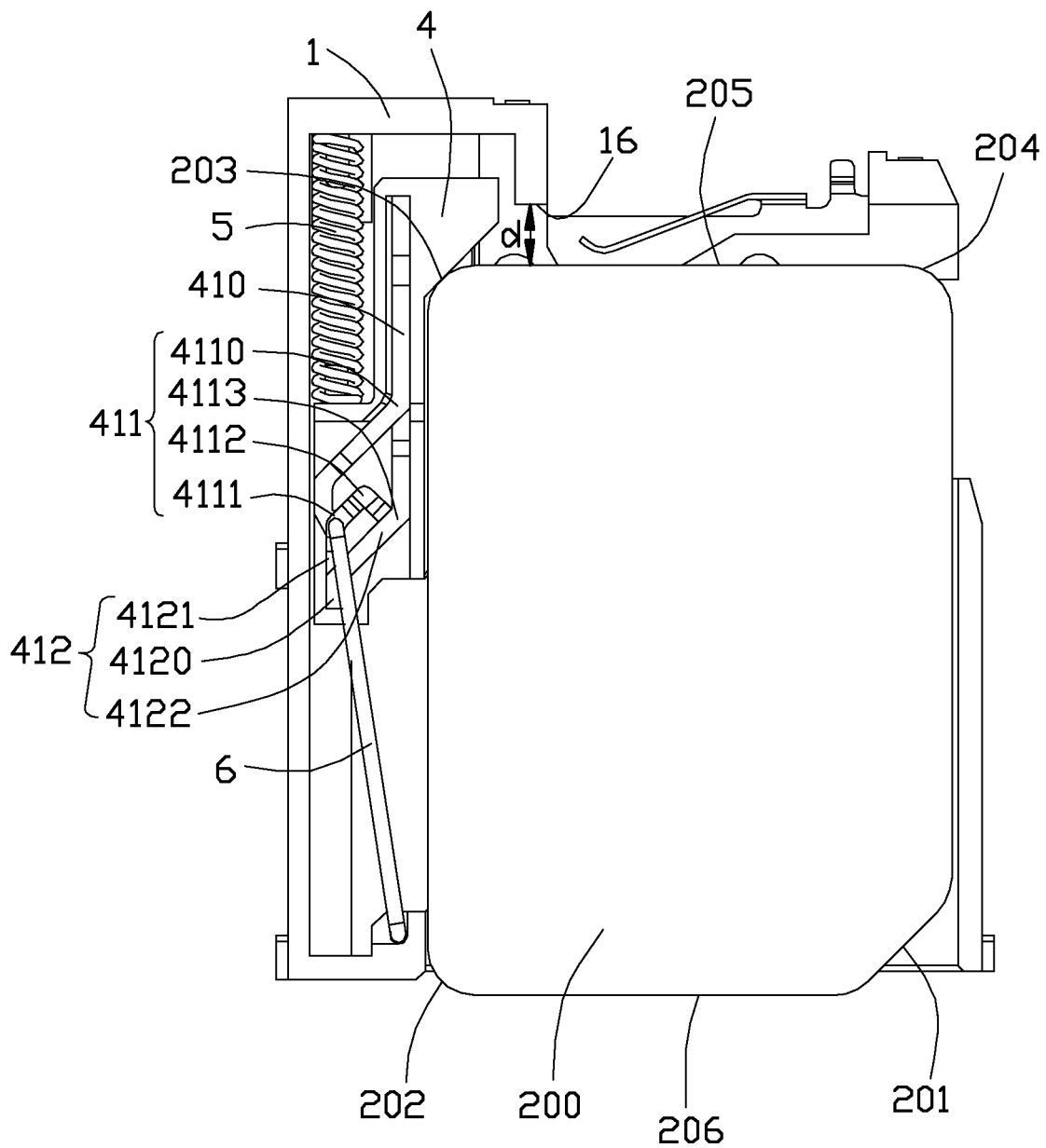
FIGS. 13, 14, and 15 are elevational views of the electrical card inserted into the electrical card connector of FIG. 1 at a third false posture.

FIGS. 7, 10, and 13, show that the electrical card 200 is initially inserted into the electrical card connector 100 at a false posture. When the user pushes on the electrical card 200 to guide the pin member 6 at the first excessive-insertion position 4111, a distance "d" remains between the mating margin 206 (or 205) of the electrical card 200 and the second rear wall 16 of the insulative housing 1 because the right-angled corner 202 engages with the slant surface 421 of the slider 4 instead of the cut-up corner 201. Therefore, where the pin member 6 goes, the locking position 4112 or the outer cam slot 412, depends on whether an enduring operation force is actuated by the user on the electrical card 200 when the pin member 6 is positioned at the first excessive-insertion position 4111.

Figure 8:
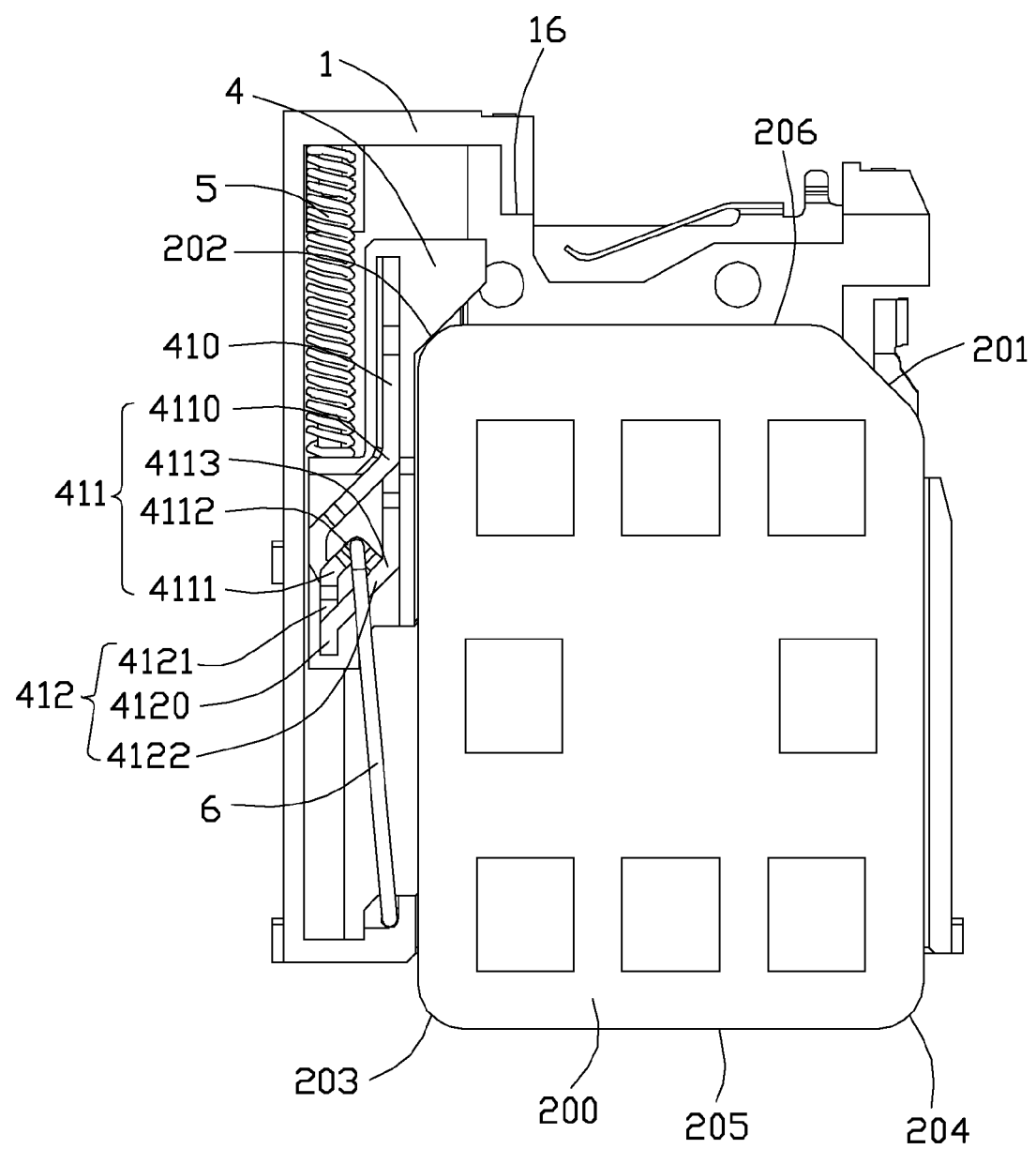
Figure 11:
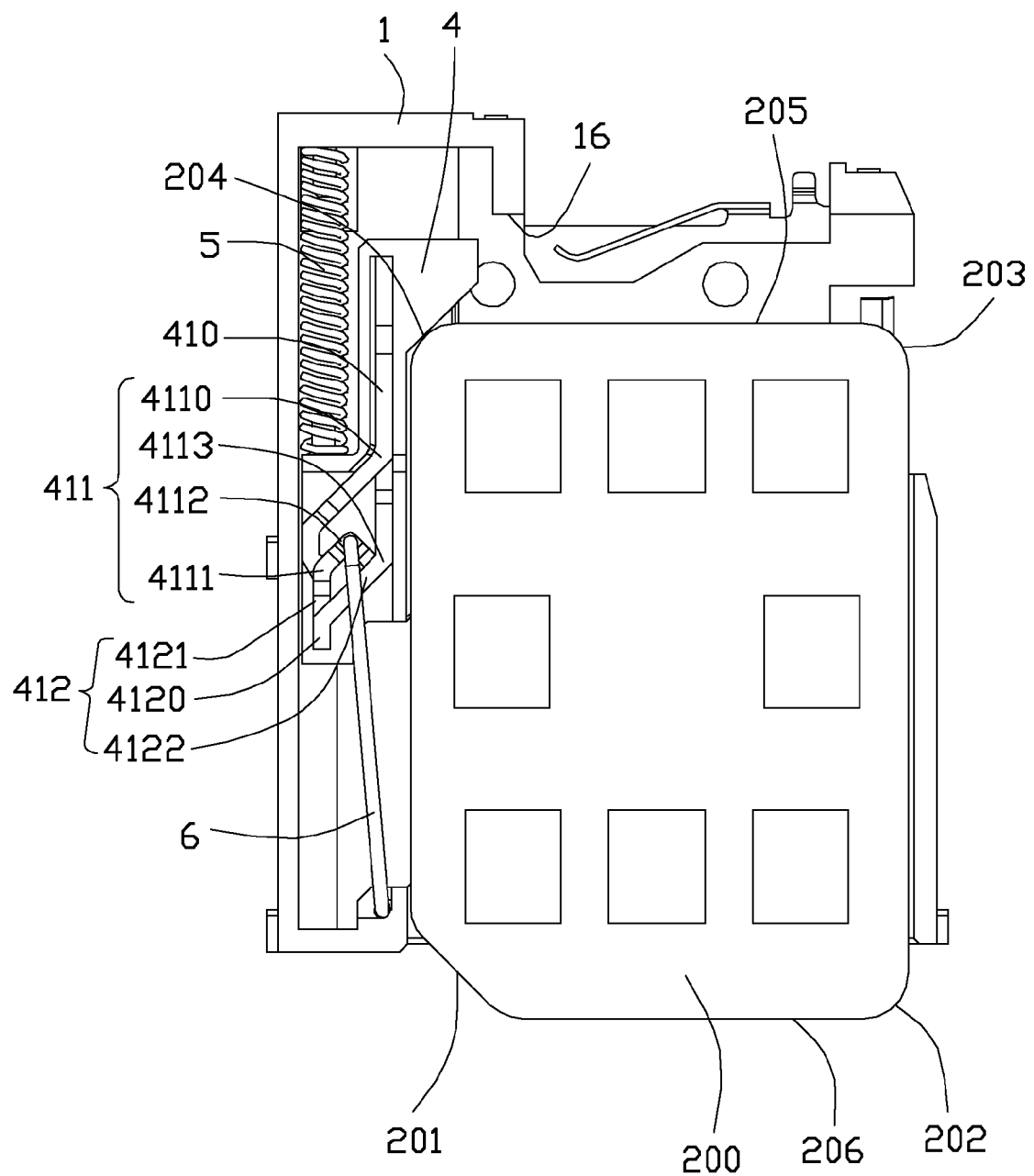
Figure 14:
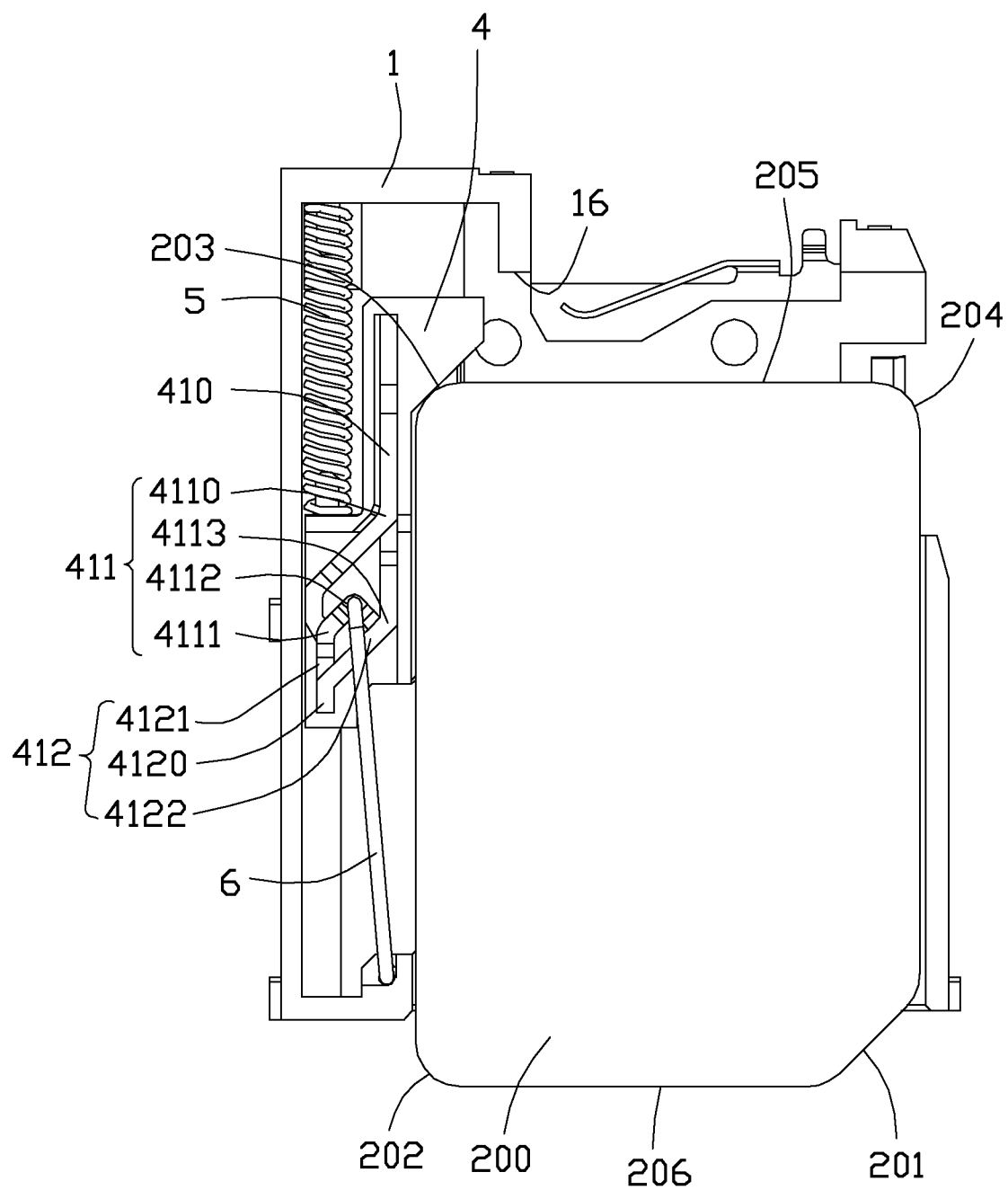

Referring to FIGS. 8, 11, and 14, the user timely releases the operation force on the electrical card 200 when the pin member 6 is positioned at the first excessive-insertion position 4111. Because no operation force is actuated on the electrical card 200, the pin member 6 no longer moves along the insertion direction but moves to the locking position 4112 and secured in the locking position 4112 as like the normal insertion posture of the electrical card 200 described above. In this condition, the electrical card 200 is still exposed out of the electrical card connector 100 for about a finger length of itself, indicating false insertion of the electrical card 200. Then, the user should push on the electrical card 200 again, as like normal ejection of the electrical card 200, for guiding the pin member 6 to move from the locking position 4112, across the second excessive-insertion position 4113, and to the initial position 4110. The electrical card 200 is finally drawn out of the electrical card connector 100.

Figure 9:
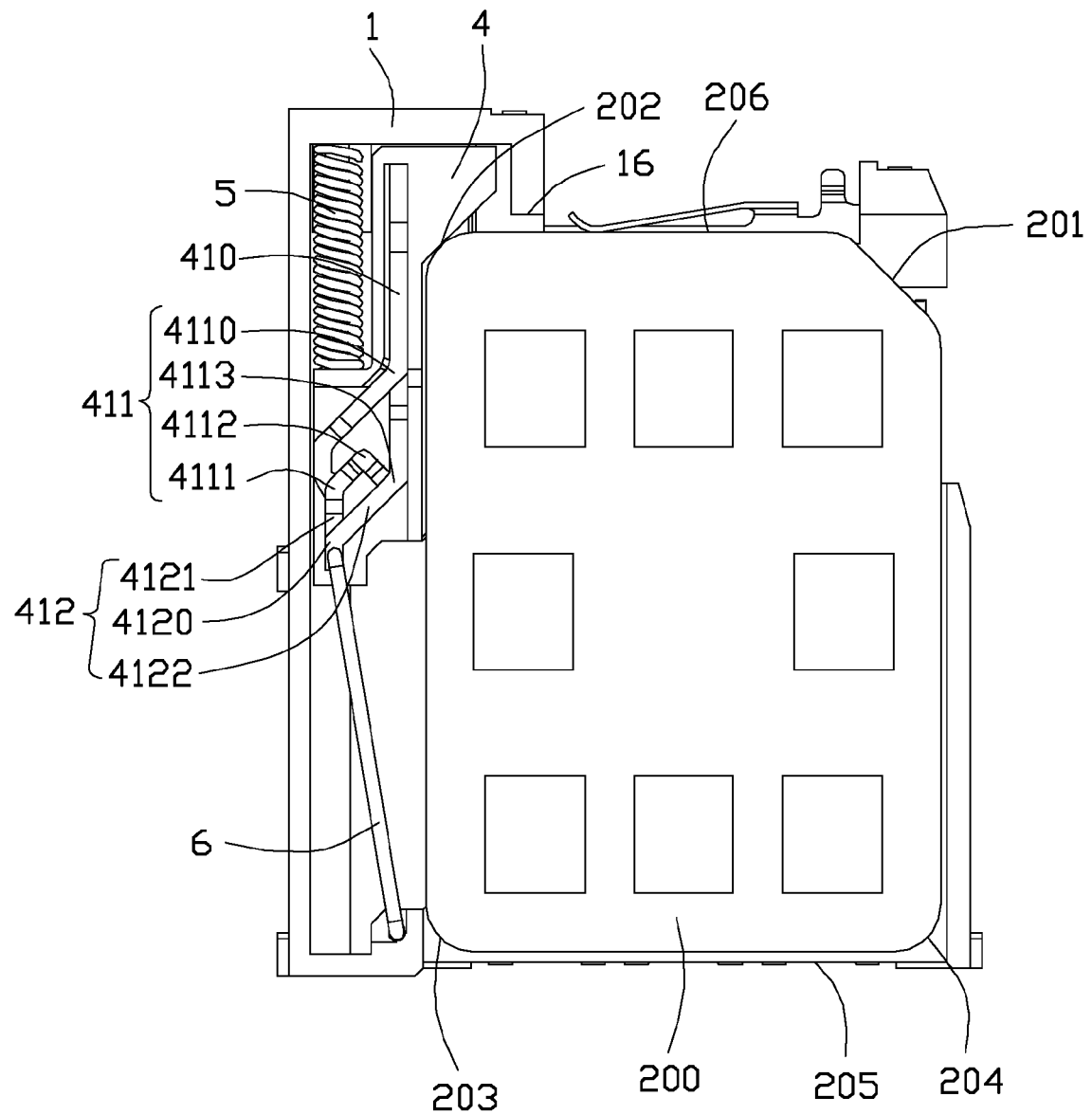
Figure 12:
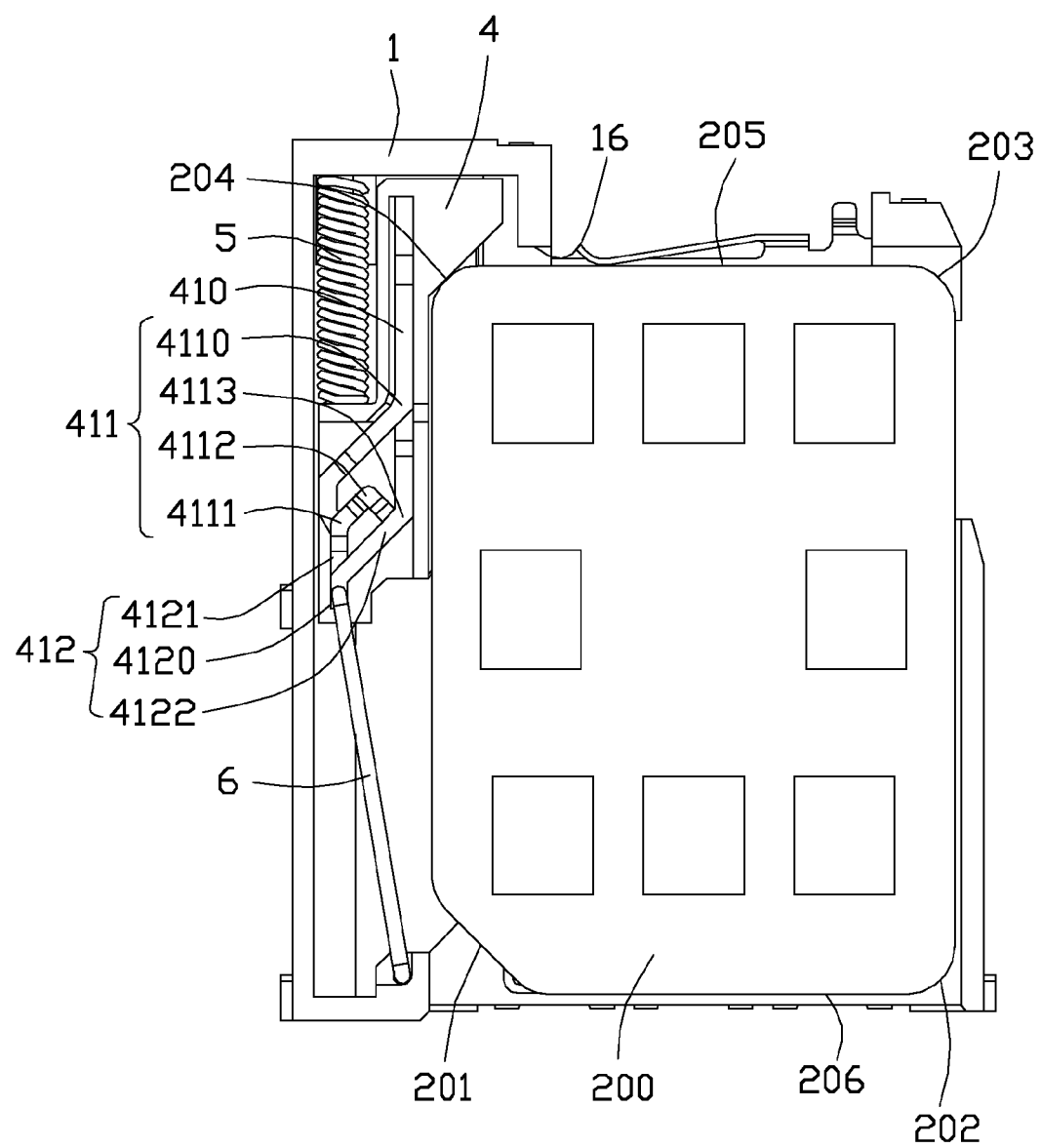
Figure 15:
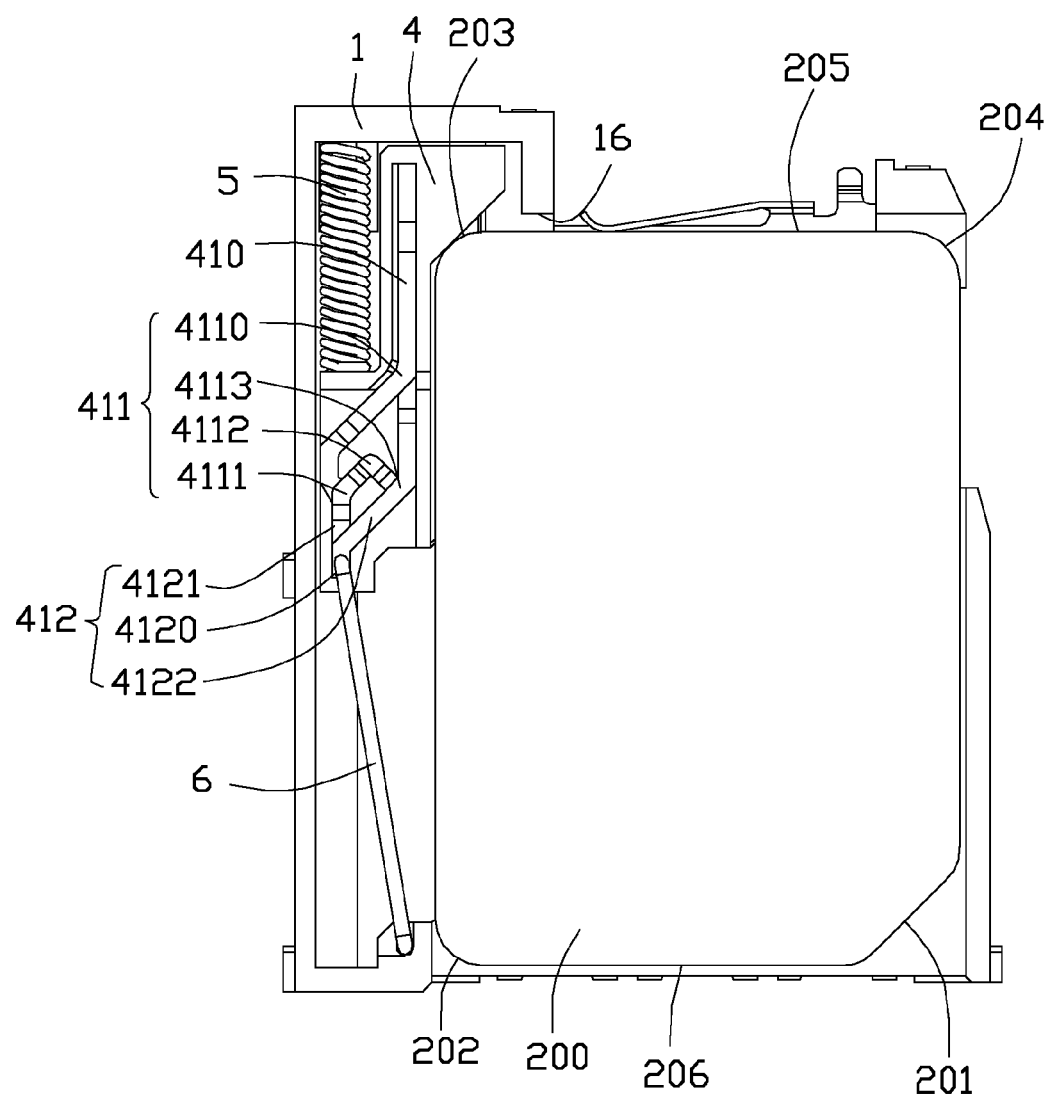

Referring to FIGS. 9, 12, and 15, the user keeps on applying the operation force to the electrical card 200 when the pin member 6 is positioned at the first excessive-insertion position 4111. Therefore, the pin member 6 moves from the first excessive-insertion position 4111 into the outer cam slot 412 instead of the locking position 4112. Because the left cam slot 4121 has a depth smaller than the right cam slot 4122, the pin member 6 slips from the left cam slot 4121, across the acute corner portion 4120, into the right cam slot 4122, and finally at the initial position 4110. Overall, the ejection of the electrical card 200 is a rapid and automatic process after the pin member 6 is pushed into the outer cam slot 412.

The normal posture of the electrical card 200 is distinguishable from the three false postures of the electrical card 200 because the electrical card 200 is inserted deeper at the normal posture than the three false postures, resulting in that the electrical card 200 of the normal posture engages with the second rear wall 16 when the pin member 6 is positioned at the first excessive-insertion position 4111 for indicating the user to release operation force on the normally inserted electrical card 200 while the electrical card 200 of the false postures spaces from the second rear wall 16 for the distance "d" when the pin member 6 is positioned at the first excessive-insertion position 4111 for not-indicating the user to release operation force on the falsely inserted electrical card 200. Therefore, the more possibly occurred condition of the falsely inserted electrical card 200 is shown as FIGS. 9, 12, and 15, in which the falsely inserted electrical card 200 slides into the outer cam slot 412 and rapidly flies out of the receiving space 10 of the electrical card connector 100.

The outer cam slot 412 of the electrical card connector 100 is attached to the inner heart-shaped slot 411 for correcting false insertion of the electrical card 200. The outer cam slot 412 and the inner heart-shaped slot 411 are both defined on the slider 4, which is conveniently manufactured for cost-saving purpose. In brief, the whole slot structure essentially forms two loop paths of which one is for use with the correct insertion while the other is for the incorrect insertion wherein the loop path for the correction insertion provides a locking position so as to allow the slider to be retained in the inner locked position while the loop path for the incorrect insertion provides no locking position so as not to allow the slider to be retained in the inner locked position but returning to the outer ejected position. In this embodiment, those two loop paths share the same initial route and the same final route path while being divergent from each other with the two different intermediate routes wherein the intermediate route of the loop path for the correct insertion provides the locking position for the pin member while that of the other provides no.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
    an insulative housing;
    a plurality of contacts retained in the insulative housing;
    a metal shell covering the insulative housing for defining a receiving space;
    a slider moveably assembled on the insulative housing, the slider comprising a base portion and an actuating portion sidewardly protruding from the base portion into the receiving space, the slider having a guiding slot, an inner heart-shaped slot connecting with the guiding slot, and an outer cam slot located behind and connecting with the inner heart-shaped slot, wherein the inner heart-shaped slot has a locking portion, an initial position at a front side of the locking portion, a first excessive-insertion position at a left and back side of the locking portion, and a second excessive-insertion position at a right and back side of the locking portion while the outer cam slot has a left cam slot connected to the first excessive-insertion position, a right cam slot connected to the second excessive-insertion position, and an acute corner portion connecting between the left cam slot and the right cam slot;
    a spring member biasing the slider; and
    a pin member having a first end secured to the insulative housing and a second end, the second end being normally guided in the inner heart-shaped slot but guided through the outer cam slot to reject an improperly inserted card.

2. The electrical card connector as claimed in claim 1, wherein the locking portion is forwardly recessed towards the initial position with respect to the first excessive-insertion position and the second excessive-insertion position while the acute corner portion protrudes backwardly opposite to the locking portion.

3. The electrical card connector as claimed in claim 1, wherein the insulative housing comprises a main portion, a left wall and a right wall extending vertically from two lateral edges of the main portion, a front wall and a first rear wall oppositely facing and both connecting with the left wall, and a second rear wall connecting to the first rear wall for connecting with a mating margin of a normally-inserted electrical card.

4. The electrical card connector as claimed in claim 3, wherein the second rear wall is positioned between the front wall and the first rear wall along an insertion/ejection direction and between the left wall and the right wall along a transverse direction perpendicular to the insertion/ejection direction.

5. An electrical card connector for use with an electronic card, comprising:
    an insulative housing defining a card receiving space therein for receiving the electronic card;
    a plurality of contacts retained in the insulative housing with corresponding contacting sections extending into the card receiving space;
    a slider moveably positioned on the insulative housing and beside the card receiving space and moveable along a front-to-back direction essentially between opposite inner/rear locked and outer/front ejected positions, the slider comprising a base portion and an actuating portion sidewardly protruding from the base portion toward the receiving space,
    the slider forming a multi-sector slot structure defining a first loop path for a correct insertion and a second loop path for an incorrect insertion;
    a spring constantly urging the slider forward toward the outer ejected position;
    a pin member having opposite first and second ends, the first end being fixed while the second end moveable along the slot structure; and
    both said first loop path and said second loop path sharing a same initial route and a same final route while being divergent from each other with corresponding intermediate routes between said same initial route and said same final route; wherein
    the intermediate route of the first loop path forms a locking position to lock the slider in the inner locked position while the intermediate route of the second loop path forms no locking position so that the slider is not locked in the inner locked position but moves back to the outer ejected position.

6. The electrical card connector as claimed in claim 5, wherein the intermediate route of the first loop path is located rearward behind that of the second loop path in the front-to-back direction.

7. The electrical card connector as claimed in claim 5, further including a stopper, around a rear area of the housing, adapted to abut against the electronic card for use with the correct insertion of the card so as not to allow the pin member to move along the second intermediate route.

8. The electrical card connector as claimed in claim 7, wherein said stopper is essentially spaced from the electronic card under the incorrect insertion even though the slider is moved to a rearmost position.

9. The electrical card connector as claimed in claim 8, wherein said slider is not moved to the rearmost position during the correct insertion of the electronic card due to abutment between the stopper and the electronic card.

10. The electrical card connector as claimed in claim 7, wherein said stopper is formed on the housing.

11. The electrical card connector as claimed in claim 5, further including a metallic shell assembled to the housing to shield said card receiving space in a vertical direction perpendicular to said front-to-back direction, wherein the shell forms around a rear end thereof a spring arm for abutting against the electronic card for use with correct insertion.

12. A method of identifying correct insertion of an electronic card into an electrical card connector, comprising steps of:

providing the electrical card connector with an insulative housing having a card receiving space with a plurality of contacts therein;
providing a slider positioned beside the card receiving space and moveable along a front-to-back direction between opposite front ejected and rear locked positions;
providing a pin member with opposite fixed and moving ends;
providing a spring to constantly urge the slider forward;
equipping said slider with a multi-sector slot structure to define a first loop path and a second loop path along which the moving end of the pin member moves selectively; and
actuating the slider to guide the pin member to move either along the first loop path to arrive at the rear locked position in response to correct insertion of the electronic card or along the second loop path to arrive at the front rejected position in response to incorrect insertion of the electronic card.

13. The method as claimed in claim 12, further including a step of providing a stopper, around a rear area of the housing, adapted to abut against the electronic card under correct insertion while being free from electronic card under incorrect insertion.

14. The method as claimed in claim 13, wherein said stopper is formed by the housing.

15. The method as claimed in claim 13, further including a step of assembling a metallic shell upon the housing to shield the card receiving space in a vertical direction perpendicular to said front-to-back direction.

16. The method as claimed in claim 12, wherein said first loop path and said second loop path partially share with each other.

17. The method as claimed in claim 16, wherein an unshared portion of the first loop path is located behind that of the second loop path in the front-to-back direction.

18. The method as claimed in claim 16, wherein a shared portion between said first loop path and the second loop path includes an initial route and a final route of each of said first loop path and said second loop path.

* * * * *